United States Patent
Yoo et al.

(10) Patent No.: US 8,395,585 B2
(45) Date of Patent: Mar. 12, 2013

(54) DISPLAY DEVICE AND FRONT COVER THEREOF

(75) Inventors: Hyong Jun Yoo, Hwaseong-si (KR); Hyeon Joo Lee, Suwon-si (KR); Sang Hak Kim, Suwon-si (KR); Jeong Su Lim, Suwon-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 545 days.

(21) Appl. No.: 12/546,819

(22) Filed: Aug. 25, 2009

(65) Prior Publication Data

US 2010/0090962 A1 Apr. 15, 2010

(30) Foreign Application Priority Data

Oct. 9, 2008 (KR) ................ 10-2008-0098920

(51) Int. Cl.
*G06F 3/02* (2006.01)

(52) U.S. Cl. ........ 345/170; 362/615; 362/600; 362/609; 362/341; 345/168

(58) Field of Classification Search .............. None
See application file for complete search history.

(56) References Cited

U.S. PATENT DOCUMENTS

| | | | |
|---|---|---|---|
| 5,064,276 A * | 11/1991 | Endo et al. ............ 349/64 |
| 5,153,590 A * | 10/1992 | Charlier ............ 341/31 |
| 5,339,178 A * | 8/1994 | Phelps et al. ............ 349/62 |
| 6,067,070 A * | 5/2000 | Suzuki et al. ............ 345/660 |
| 6,255,781 B1 * | 7/2001 | Tsumura ............ 315/169.1 |
| 6,462,941 B1 * | 10/2002 | Hulick et al. ............ 361/679.24 |
| 6,803,903 B1 * | 10/2004 | Ostergård et al. ............ 345/168 |
| 7,050,764 B2 * | 5/2006 | Carlson ............ 455/90.3 |
| 7,303,322 B2 * | 12/2007 | Lamb et al. ............ 362/600 |
| 7,379,720 B2 * | 5/2008 | Klinghult et al. ............ 455/157.2 |
| 7,520,655 B2 * | 4/2009 | Morishita ............ 362/632 |
| 7,736,042 B2 * | 6/2010 | Park et al. ............ 362/602 |
| 7,911,438 B2 * | 3/2011 | Okazaki ............ 345/102 |
| 7,936,956 B2 * | 5/2011 | Marttila et al. ............ 385/36 |
| 2004/0203493 A1* | 10/2004 | Carlson ............ 455/90.1 |
| 2005/0124393 A1* | 6/2005 | Nuovo et al. ............ 455/575.1 |
| 2007/0070646 A1* | 3/2007 | Morishita ............ 362/561 |
| 2007/0103853 A1* | 5/2007 | Kao ............ 361/681 |
| 2007/0279935 A1* | 12/2007 | Gardiner et al. ............ 362/610 |
| 2008/0101082 A1* | 5/2008 | Kitamura et al. ............ 362/606 |
| 2008/0232135 A1* | 9/2008 | Kinder et al. ............ 362/615 |
| 2010/0060611 A1* | 3/2010 | Nie ............ 345/175 |
| 2010/0128490 A1* | 5/2010 | Shiu ............ 362/341 |
| 2010/0149205 A1* | 6/2010 | Robinson et al. ............ 345/589 |
| 2010/0165660 A1* | 7/2010 | Weber et al. ............ 362/609 |
| 2011/0102451 A1* | 5/2011 | Broga et al. ............ 345/589 |

FOREIGN PATENT DOCUMENTS

| KR | 2003-44852 | 6/2003 |
|---|---|---|
| KR | 2004-66410 | 7/2004 |

* cited by examiner

*Primary Examiner* — Van Chow

(74) *Attorney, Agent, or Firm* — Stanzione & Kim, LLP

(57) ABSTRACT

Disclosed are a display device and a front cover thereof. The display device includes a display module to form an image, a front cover to cover a rim of a front surface of the display module, a keypad display provided at the front cover, at least one light emitting unit to emit light to the keypad display disposed between the display module and the front cover, and at least one light guide channel provided at the keypad display, the light guide channel having a cross-sectional area decreasing away from the light emitting unit.

23 Claims, 11 Drawing Sheets

DISPLAY DEVICE AND FRONT COVER THEREOF

CROSS-REFERENCE TO RELATED APPLICATIONS

This application claims the benefit of priority under 35 U.S.C. §119(a) from Korean Patent Application No. 2008-0098920, filed on Oct. 9, 2008 in the Korean Intellectual Property Office, the disclosure of which is incorporated herein by reference in its entirety.

BACKGROUND

1. Field of the Invention

The present general inventive concept relates to a display device, and, more particularly, to a front cover thereof to display operating conditions of the display device.

2. Description of the Related Art

Display devices are designed to display images on a screen. Representative examples of display devices include Liquid Crystal Displays (LCDs) and Plasma Display Panels (PDPs).

In general, a display device includes a display module to form an image, a front cover to cover a rim of a front side of the display module, and a rear cover to cover a rear side of the display module.

With the recent quality enhancement of display devices, designs to fulfill basic performances of display devices as well as aesthetic demands of customers are increasingly emphasized. In particular, a front cover for a display device is seen most frequently by customers and therefore, a product image greatly depends on the functionality and designs of the front cover.

SUMMARY

The present general inventive concept provides a display device and a front cover thereof, wherein a keypad display is not distinguished from a front cover when the display device is not in operation, resulting in an improvement in the functionality and exterior appearance of the display device to effectively transfer high-quality images from products to customers.

Additional features and utilities of the present general inventive concept will be set forth in part in the description which follows and, in part, will be obvious from the description, or may be learned by practice of the general inventive concept.

Embodiments of the present general inventive concept can be achieved by providing a display device including a display module to form an image, a front cover to cover a rim of a front surface of the display module, a keypad display provided at the front cover, at least one light emitting unit to emit light to the keypad display disposed between the display module and the front cover, and at least one light guide channel provided at the keypad display and enclosing a cross sectional area decreasing away from the light emitting unit.

The keypad display may include exposure points, which are formed at the light guide channel at the farthest position from the light emitting unit and have the smallest cross sectional area.

The light guide channel may include a first incidence face adjacent to the light emitting unit, and at least one second incidence face enclosing a different cross sectional area from the first incidence face.

The light guide channel may be concavely domed in a thickness direction of the front cover.

An inner periphery of the light guide channel may include a multilayer stepped structure in a thickness direction of the front cover.

The light guide channel may include at least two incidence faces to which the light is introduced.

The front cover may include a light transmitting portion through which the light emitted from the light emitting unit is transmitted, wherein the light transmitting portion may include an outwardly exposed first thickness part to define an outer surface of the front cover and a second thickness part to define an inner surface of the front cover, the second thickness part enabling transmission of the light from the light emitting unit to the first thickness part, and wherein the first thickness part may be made of a transparent material and the second thickness part is made of a semi-transparent material.

The first incidence face and the at least one second incidence face may define a stepped structure to allow the light emitted from the light emitting unit to be dispersed and reflected in different directions.

The multilayer stepped structure may be formed by multistage laser processing.

The light guide channel may be dented in a thickness direction of the front cover through the first thickness part and the second thickness part by a predetermined inclination angle.

The front cover may include an upper portion, a lower portion, a left portion and a right portion, and the keypad display may be provided on at least one of the upper portion, lower portion, left portion and right portion.

The keypad display may take the form of letters, numbers and symbols through combinations of the exposure points.

A reflector may be provided between the display module and the light emitting unit, to enable even transmission of the light to the exposure points.

A diffuser may be provided between the light emitting unit and the at least one light guide channel, to enable even transmission of the light to the exposure points.

The light emitting unit may include an LED chip.

The light emitting unit may include an input element to sense an input.

Embodiments of the present general inventive concept can be achieved by providing a front cover of a display device, the front cover defining an exterior appearance of a front side of the display device, the front cover including a light guide recess formed from an inner surface of the front cover that faces the interior of the display device to an outer surface of the front cover, and the light guide recess to have a stepped structure enclosing different cross sectional areas on a per depth basis thereof.

An inner periphery of the light guide recess may have a multilayer stepped structure.

The multilayer stepped structure may be formed by multistage laser processing.

Embodiments of the present general inventive concept can also be achieved by providing a display device including a display module to display an image on a screen thereof, and a key display unit to display a character having one or more light guide channels spaced apart from each other by a distance variable in a direction with respect to a second direction different from the first direction.

The light guide channel may have a structure having a thickness variable in the direction with respect to the second direction.

The light guide channel may include stepped structures and an exposure point disposed between adjacent stepped structures.

The stepped structures may include a surface inclined with respect to the second direction.

BRIEF DESCRIPTION OF THE DRAWINGS

These and/or other features and utilities of the present general inventive concept will become apparent and more readily appreciated from the following description of the exemplary embodiments, taken in conjunction with the accompanying drawings, of which.

DETAILED DESCRIPTION OF THE EMBODIMENTS

Figure 1:
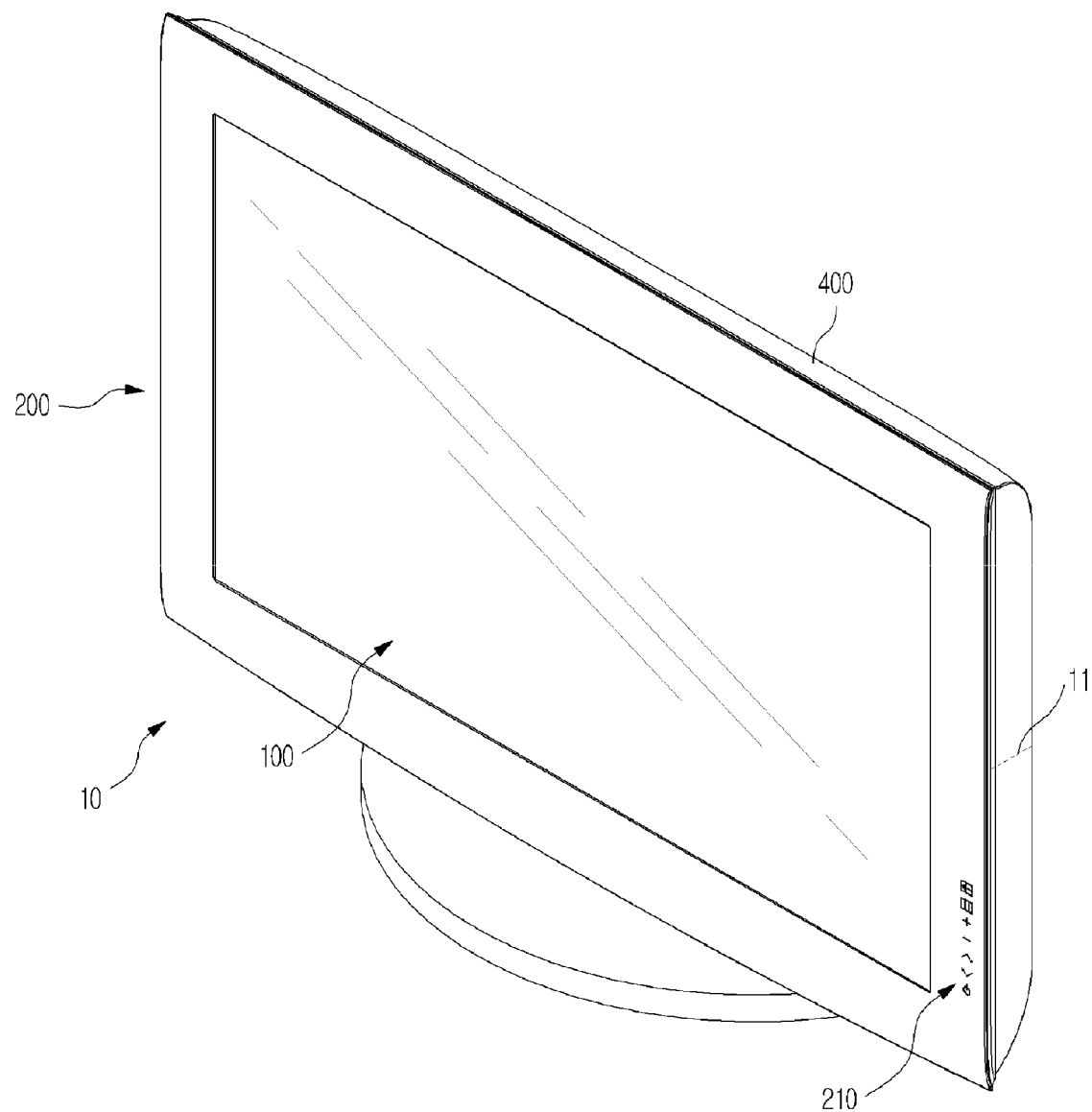
FIG. 1 is a perspective view illustrating the exterior appearance of a display device according to an exemplary embodiment of the present general inventive concept.

Reference will now be made in detail to the exemplary embodiments of the present general inventive concept, examples of which are illustrated in the accompanying drawings, wherein like reference numerals refer to like elements throughout. The exemplary embodiments are described below to explain the present general inventive concept by referring to the figures.

Figure 2:
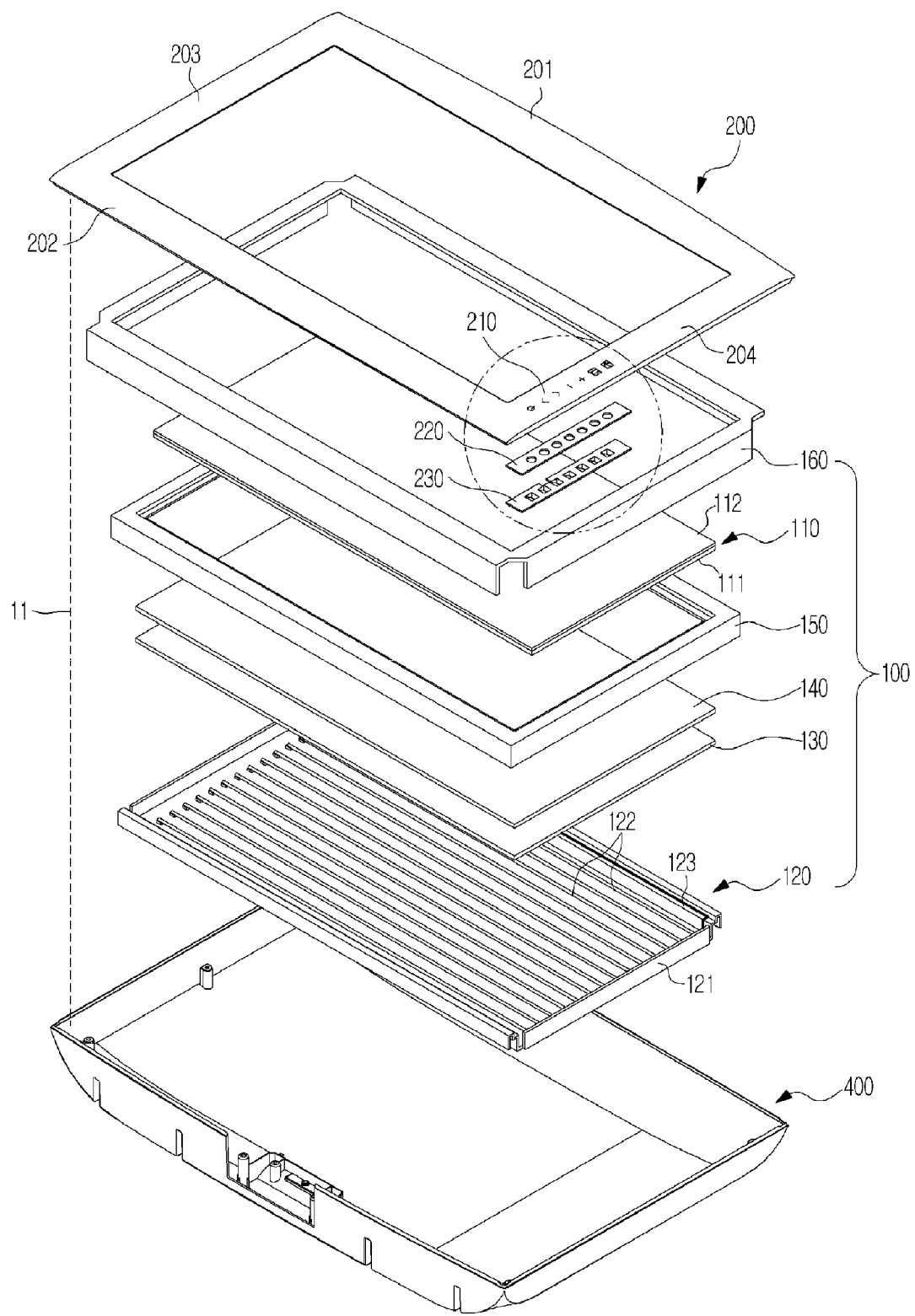
FIG. 2 is an exploded perspective view illustrating a front cover, a display module, and a rear cover of the display device of FIG. 1.

FIG. 1 is a perspective view illustrating the exterior appearance of a display device according to an exemplary embodiment of the present general inventive concept, and FIG. 2 is an exploded perspective view illustrating a front cover, a display module, and a rear cover of the display device of FIG. 1.

As illustrated in FIGS. 1 and 2, the display device 10 includes a display module 100 to display images, a front cover 200 disposed to cover part of a front surface of the display module 100, and a rear cover 400 to cover a rear surface of the display module 100.

The display module 100 includes a display panel 110 to display an image using liquid crystals, and a backlight assembly 120 to irradiate light to the display panel 110. The display panel 110 is disposed in such a way that a rear surface of the display panel 110 faces a front surface of the backlight assembly 120, and a front surface of the display panel 110 faces the front cover 200.

The display panel 110 includes a Thin Film Transistor (TFT) substrate 111, a color filter substrate 112, and a liquid crystal layer (not illustrated) interposed between the TFT substrate 111 and the color filter substrate 112. The TFT substrate 111 may include a front surface that contacts the liquid crystal layer, and a rear surface that faces the backlight assembly 120. The color filter substrate 112 may include a front surface that faces a rear surface of the front cover 200, and a rear surface that contacts the liquid crystal layer. The display panel 110 displays an image by adjusting transmissivity of the light irradiated from the backlight assembly 120.

The display panel 110 includes an effective surface (not illustrated) on which an image is displayed, and a rim surface (not illustrated) located around the effective surface (not illustrated). The rim surface of the display panel 110 may encompass an outer edge of the display panel 110 as a type of border.

The backlight assembly 120 includes a bottom chassis 121, lamps 122 arranged in the bottom chassis 121, and a reflector 123 to reflect light emitted from the lamps 122 toward the display panel 110. The lamps 122 may be disposed on a front surface of the bottom chassis 121. Additionally, the bottom chassis 121 may have a rear surface that faces the rear cover.

Optical sheets are arranged between the display panel 110 and the backlight assembly 120, to improve optical characteristics of the light irradiated from the backlight assembly 120. The optical sheets may include a diffuser sheet 130 and a condenser sheet 140. The diffuser sheet 130 serves to diffuse the light irradiated from the backlight assembly 120, improving brightness uniformity. The condenser sheet 140 serves to align a direction of light so as to allow the light diffused from the diffuser sheet 130 to be introduced orthogonally into the display panel 110. The diffuser sheet 130 may have a front surface to contact a rear surface of the condenser sheet 140, and a rear surface that faces the backlight assembly 120. Additionally, the condenser sheet may have a front surface that faces the display panel 110.

A middle mold 150 is provided between the display panel 110 and the backlight assembly 120. The optical sheets 130 and 140 are supported between the middle mold 150 and the bottom chassis 121. The middle mold 150 may have a front surface that faces the rear surface of the display panel 110, and a rear surface that faces the front surface of the condenser sheet 140. A top chassis 160 is disposed in front of the display panel 110, and the display panel 110 is supported between the top chassis 160 and the middle mold 150. Additionally, the top chassis 160 may have a front surface that faces the rear surface of the front cover 200, and a rear surface that faces a front surface of the display panel 110.

The front cover 200 is coupled with the rear cover 400, to define a receiving space 11 therebetween. A variety of elements including the display module 100 may be installed in the receiving space 11. For example, the backlight assembly 120, diffuser sheet 130, condenser sheet 140, middle mold 150, display panel 110, and top chassis 160 may be installed in the receiving space. The front cover 200 is disposed so that the rear surface of the front cover 200 faces the front surface of the top chassis 160. Additionally, the front cover 200 may have a front surface that faces a user, to form the exterior appearance of a front side of the display device 10. The front cover 200 is formed as an approximately rectangular frame and covers a rim of the display module 100 that is disposed on a front surface of the display module that faces the rear surface of the front cover 200. The front cover 200 includes an upper portion 201, a lower portion 202, a left portion 203 and a right portion 204 to cover the entire rim of the display module 100. The rim of the display module 100 may include an upper rim, a lower rim, a left rim, and a right rim. The front surface of the front cover 200 and the front surface of the display module 100, excluding the rim covered by the front cover 200, are visible to a user.

Figure 3:
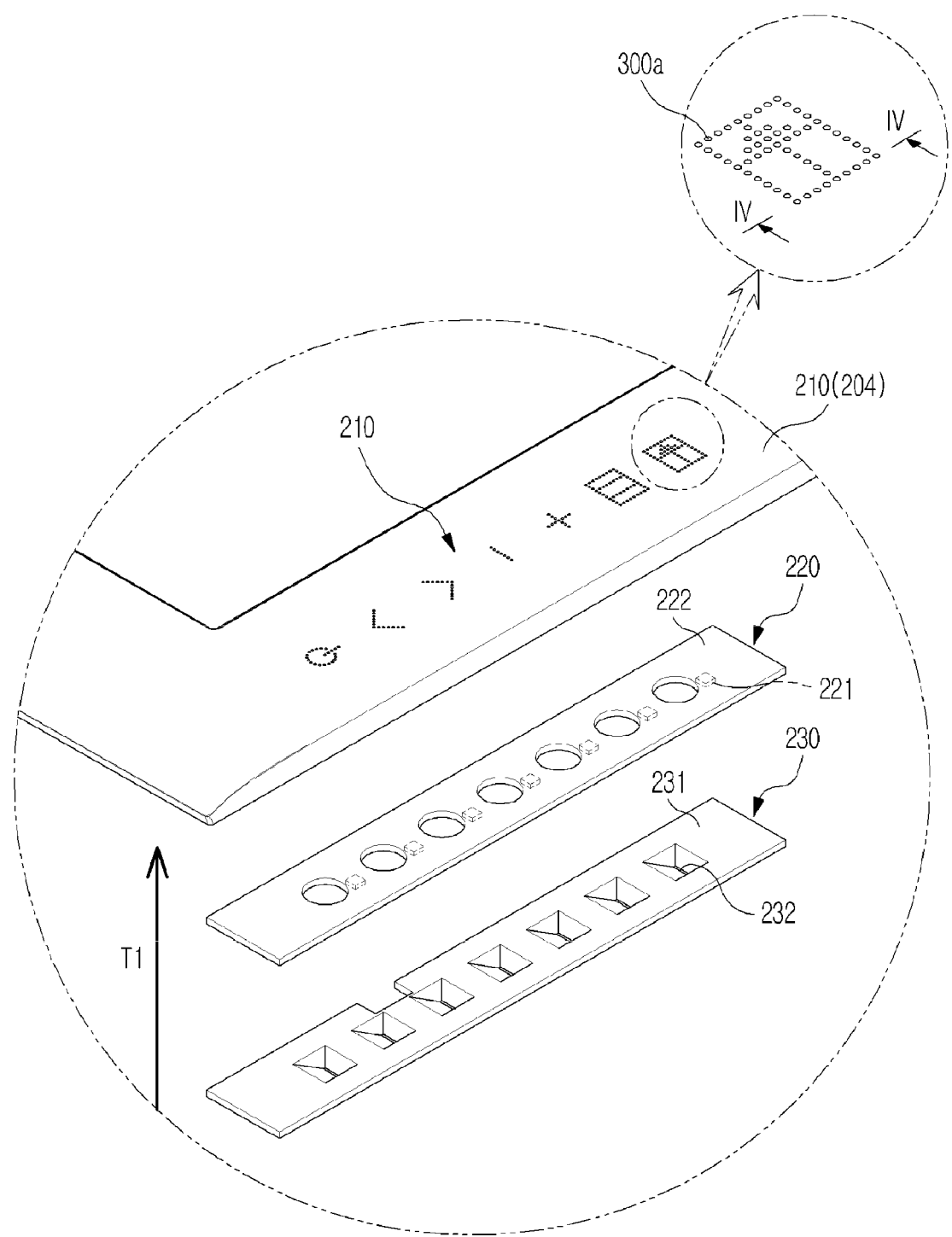
FIG. 3 is an enlarged perspective view illustrating a right part of a front cover.

FIG. 3 is an enlarged perspective view illustrating the right portion 204 of the front cover 200. As illustrated in FIGS. 2 and 3, the right portion 204 of the front cover 200 is provided with a keypad display 210 to display operating conditions of the display device 10 to a user viewing the front surface of the front cover 200. Although FIG. 3 illustrates the keypad display 210 provided at the right portion 204 of the front cover 200, the keypad display 210 may be provided at any portion of the front cover 200, including the upper portion 201, lower portion 202, and left portion 203 of the front cover 200.

The keypad display 210 includes of one or more letters, numbers, symbols, and the like to indicate operating conditions of the display device 10. In the present exemplary embodiment, the keypad display 210 is formed at the front surface of the front cover 200. The keypad display 210 is formed as a very small exposed part at the front surface of the front cover 200. During operation of the display device 10, the keypad display 210 is distinguished from the front cover 200 and is viewable by a user. The keypad display 210 includes exposure points 300a from which light from a light emitting unit 200 that will be described hereinafter is emitted in a direction that corresponds to a thickness direction T1, to be described hereinafter, of the front surface of the front cover 200, so that a user may view the emitted light.

The keypad display 210 is able to display letters, numbers, symbols, and the like to a user on the basis of the use status of the display device 10 via various arrangements of the exposure points 300a. Each exposure point 300a has a sufficiently small cross-sectional area, such that a user may have increased difficulty in visually perceiving the exposure points 300a by looking at the front cover 200 when the display device 10 is not in operation. Those skilled in the art will be able to easily determine a size of the exposure points 300a, in consideration of the visual resolution of people, such that the exposure points 300a cannot be visually perceived by the user when the display device 10 is not in operation, and can be perceived by a user viewing the front cover 200 only when the display device 10 is operated. Although FIG. 3 illustrates the circular exposure points 300a, the exposure points 300a may have various other shapes based on the shapes of letters, numbers, symbols, and the like.

The keypad display 210, a light emitting unit 220, and a reflector 230 may be referred to as a keypad display unit or a character display unit. Additionally, the keypad display 210, the light emitting unit 220, and a diffuser 240 may also be referred to as a keypad display unit or a character display unit.

Figure 4:
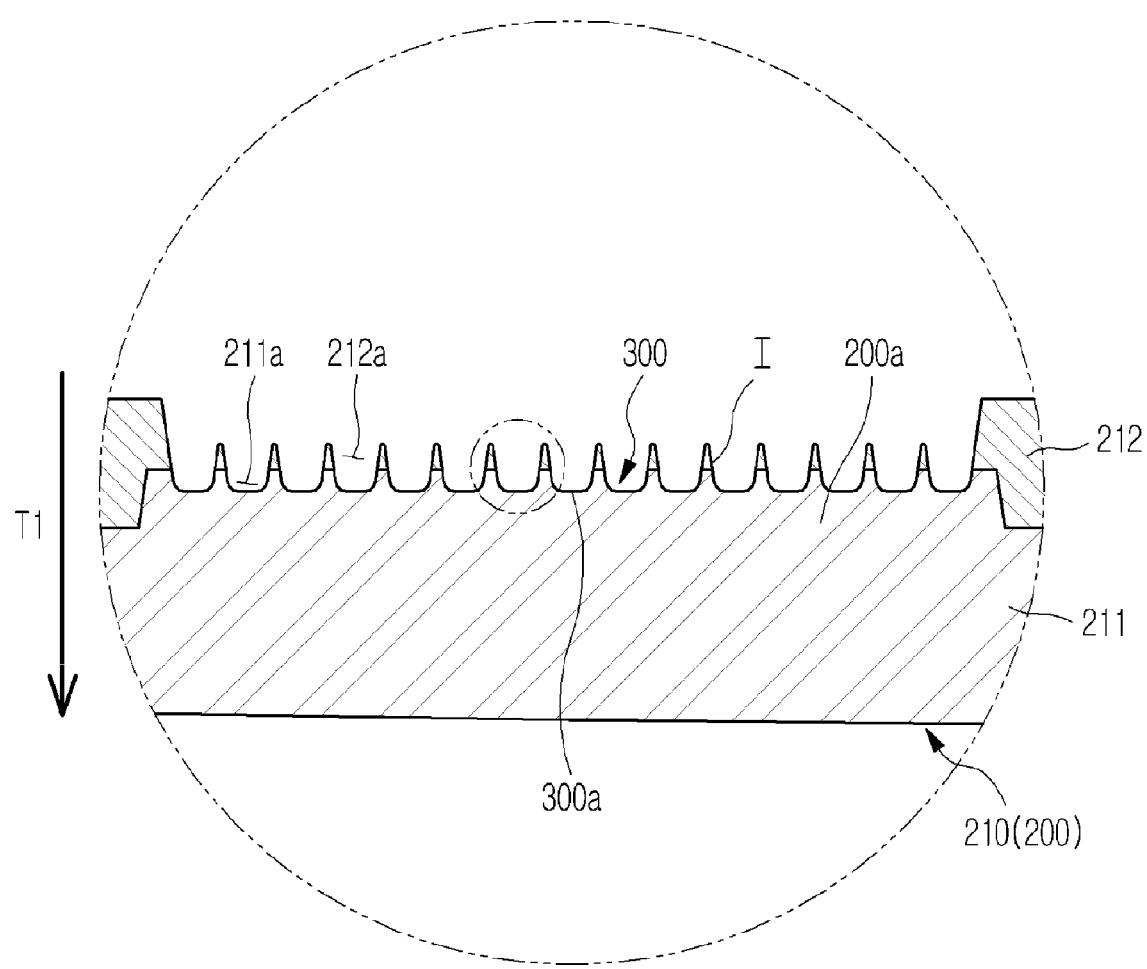
FIG. 4 is a sectional view taken along the line IV-IV of FIG. 3.
Figure 5:
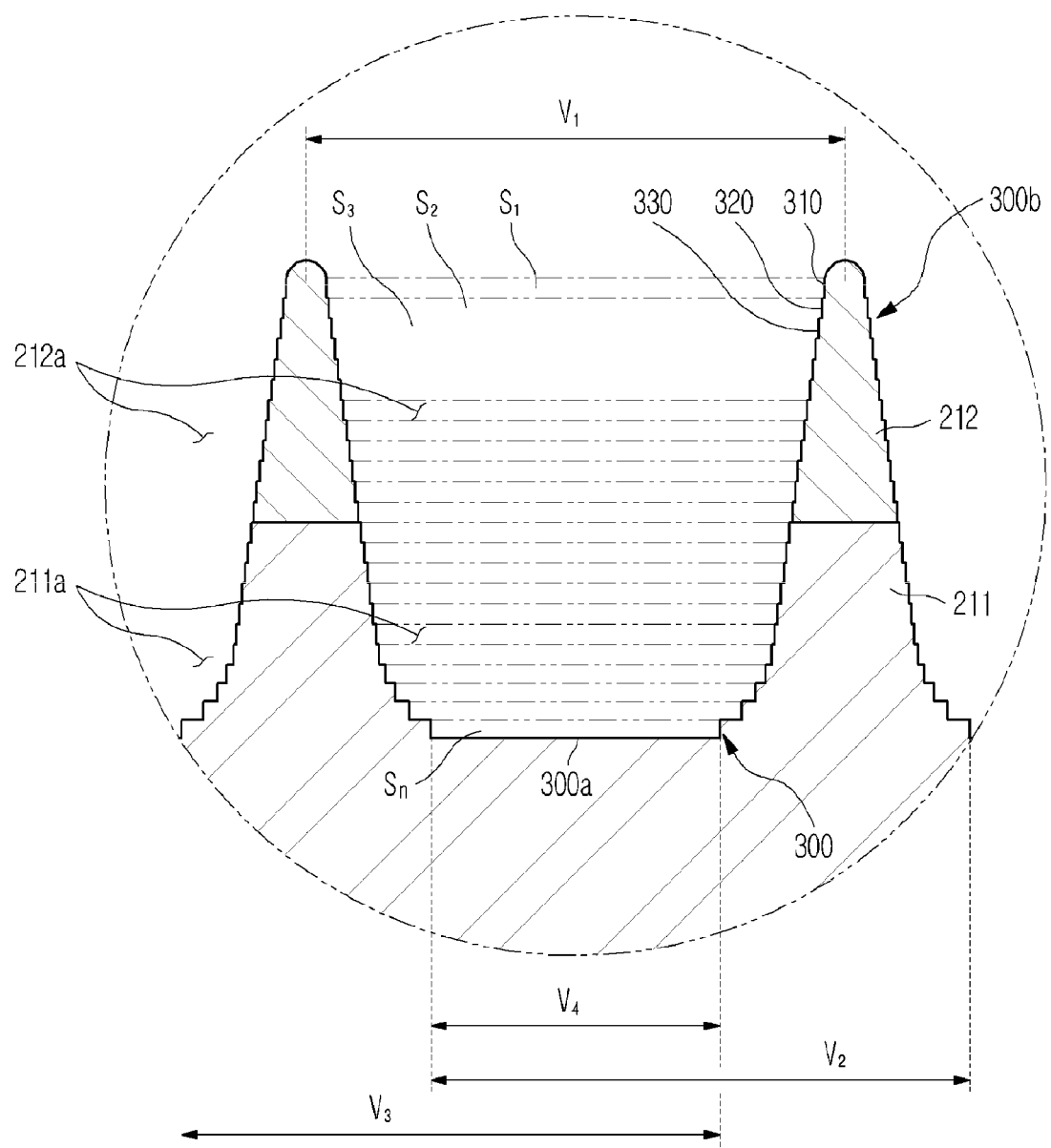
FIG. 5 is an enlarged partial sectional view of FIG. 4.

FIG. 4 is a sectional view taken along the line IV-IV of FIG. 3, and FIG. 5 is an enlarged partial sectional view of FIG. 4.

As illustrated in FIGS. 3 to 5, the front cover 200 is provided with a light transmitting portion 200a to allow the transmission of light emitted from a light emitting unit 220, so that the emitted light may be viewable to a user at the keypad display 210.

The light transmitting portion 200a may include a first thickness part 211 to define an external appearance or the front (outer) surface of the front cover 200, and a second thickness part 212 to define the rear (inner) surface of the front cover 200, the second thickness part 212 to transmit the light, emitted from the light emitting unit 220, to the first thickness part 211.

The first thickness part 211 is provided with the above-described exposure points 300a. The first thickness part 211 is made of a transparent material and has high transmissivity of light to allow a user to correctly perceive the keypad display 210, even in the dark, when the light emitting unit 220 emits light towards a user in the thickness direction T1. The second thickness part 212 is made of a semi-transparent material having a desired thickness suitable for the user's preference. It is possible that the first thickness part 211 has transparent characteristics greater than those of the second thickness part 212. Specifically, the transparent first thickness part 211 defines the front (outer) surface of the front cover 200, and the semi-transparent second thickness part 212 is located at a rear side of the transparent first thickness part 211 so as to define the rear (inner) surface of the front cover 200.

The first thickness part 211 and the second thickness part 212 may be integrally formed via a process of double injection molding. Upon double injection molding of the first thickness part 211 and the second thickness part 212, an injection molding sequence depends on the convenience of molding. The first thickness part 211 may be primarily injection molded and then, the second thickness part 212 may be secondarily injection molded, or vice versa. Also, the first thickness part 211 and the second thickness part 212 may be formed using plastics, such as polycarbonate (PC), polymethyl methacrylate (PMMA), or acrylonitrile-butadiene-styrene (ABS). The second thickness 212 part may be made of an opaque material and may be integrally formed with the first thickness part via injection molding.

A light transmitting portion 200a has an incidence plane I facing the light emitting unit 220. The incidence plane I is provided with a light guide channel 300 which is formed in a portion of the first thickness part 211 and the second thickness part 212. That is, at least one light guide channel 300 is formed at the inner surface of the front cover 200 so as to correspond to the keypad display 210 formed at the outer surface of the front cover 200. Here, the at least one light guide channel 300 formed at the inner surface of the front cover 200 encloses a cross-sectional area, which is gradually reduced away from the light emitting unit 220. The light guide channel 300 includes an opening of the first thickness part 211a and an opening of the second thickness part 212a. Additionally, the light guide channel includes the exposure points 300a.

As illustrated in FIG. 4, the light guide channel 300 is formed in a thickness direction T1 of the front cover 200 through the second thickness part 212 and the first thickness part 211 such that the light emitted from the light emitting unit (not illustrated) is introduced into the light guide channel 300. In other words, the light guide channel 300 is formed by creating the opening of the second thickness part 212a and the opening of the first thickness part 211a, respectively. The light guide channel 300 is formed so that the cross-sectional area of the light guide channel decreases in the thickness direction T1.

More specifically, the light guide channel 300 is formed in the incidence plane I by a predetermined inclination angle through the first thickness part 211 and the second thickness part 212, for dispersion and reflection of light. With the formation of the light guide channel 300, most of the light emitted from the light emitting unit can be transmitted to the keypad display 210, rather than undergoing total reflection.

As illustrated in FIG. 5, an inner periphery of each of the light guide channels 300 may have a multilayer stepped structure 300b. The multilayer stepped structure 300b includes a first incidence face 310 provided at a tip end of the second thickness part 212 of the light transmitting portion 200a, and at least one second incidence face 320 stepped from the first incidence face 310 towards the first thickness part 211. Additionally, as illustrated in FIG. 5, the first incidence face 310 and the second incidence face 320 may have different cross-sectional areas enclosed thereby. For example, as illustrated in FIG. 5, the first incidence face 310 may have a cross-sectional area ($S_1$) that is larger than the cross-sectional area ($S_2$) of the second incidence face 320.

The multilayer stepped structure 300b may include any number of incidence faces, for example, first incidence face 310, second incidence face 320, third incidence faces 330 . . . nth incidence face, etc. Additionally, each incidence face may have a smaller cross-sectional area than the previous incidence face. For example, the first incidence face 310 may have a cross-sectional area of $S_1$, the second incidence face 320 may have a cross-sectional area of $S_2$ . . . the nth incidence face may have a cross-sectional area of $S_n$, etc. Accordingly, the cross-sectional area $S_n$ is smaller than all previous cross-sectional areas, including $S_1$, $S_2$, etc.

The light emitted from the light emitting unit 220 to the keypad display 210 is dispersed and reflected in different directions by the light guide channel 300, and more particularly, by the multilayer stepped structure 300b formed at the inner periphery of the light guide channel 300. Some light beyond a specific critical angle determined based on material characteristics of the light transmitting portion 200a is transmitted in the thickness direction T1 towards a user through the exposure points 300a of the keypad display 210. Accordingly, the user is able to visually perceive the exposure points 300a of the keypad display 210 from any angle.

The light guide channel 300 is formed at the rear surface of the front cover 200, and is formed by multistage laser processing on a per depth basis thereof. If the entire light guide channel 300 is subjected to laser processing once, the light guide channel 300 is difficult to manufacture due to a negative effect on the fusing point of the plastic front cover 200. Therefore, the light guide channel 300 having the multilayer stepped structure 300b is formed via multistage laser processing.

For example, a laser processing apparatus may irradiate a laser beam having a desired diameter once to a desired processing position on the inner surface of the front cover 200, thus forming the first incidence face 310.

Then, if a laser beam is irradiated secondarily to the previous processing position to which the laser beam was irradiated first, the second incidence face 320 is formed. As described above, the cross-sectional area $S_2$ enclosed by the second incidence face 320 is smaller than the cross-sectional area $S_1$ enclosed by the first incidence face 310, and the second incidence face 320 is stepped from the first incidence face 310 in the thickness direction T1.

Next, a third incidence face 330 may be formed as the laser beam is irradiated thirdly to the previous processing position to which the laser beam is irradiated twice. The cross-sectional area $S_3$ enclosed by the third incidence face 330 is smaller than the cross-sectional areas $S_1$ and $S_2$ enclosed by the first and second incidence faces 310 and 320. Also, the third incidence face 330 is stepped from the first and second incidence faces 310 and 320 in the thickness direction T1.

As described above, as the laser beam is repeatedly irradiated to the inner surface of the front cover 200 multiple times, to provide the light guide channel 300 having the multilayer stepped structure 300b in which a depth of the light guide channel 300 gradually increases away from the light emitting unit 220. In this way, the exposure points 300a located at the farthest distance from the light emitting unit 220 have the smallest cross-sectional area $S_n$.

As illustrated in FIG. 5, each light guide channel 300 may include, for example, visible areas $V_1$, $V_2$, $V_3$, $V_4$, or some other visible area. The visible areas are areas of the light guide channel that emits light to an area of the keypad display 210 that corresponds to a portion of a letters, numbers and symbols, etc., of the keypad display 210. Visible area $V_1$ may correspond to a width between the center of a first and a second tip end of the second thickness part 212. Visible area $V_2$ may correspond to a width between a first side of a first exposure point 300a and a first side of an adjacent exposure point 300a. Visible area $V_3$ may correspond to a width between a second side of a first exposure point 300a and a second side of an adjacent exposure point 300a. Visible $V_4$ may correspond to an exposure point 300a. Light emitted through the light guide channel 300 towards a user may be visible to a user via the visible areas $V_1$, $V_2$, $V_3$, or $V_4$. The exemplary visible areas are not limited thereto and may include any area of the light guide channel.

As illustrated in FIG. 2, the light emitting unit 220 is provided at the rear surface of the front cover 200 at a position corresponding to the keypad display 210.

The light emitting unit 220 may include at least one light emitting element 221, and a substrate 222 on which the light emitting element 221 and a preset circuit pattern are provided.

The substrate 222, corresponding to the keypad display 210, is provided with an input element 222a to sense the user's input. The input element 222a may be provided as at least one touch sensor 222a. The touch sensor 222a senses an electric contact when the user pushes the keypad display 210 and transmits a capacity variation caused by the electric contact to a controller (not illustrated) of the display device 10.

The at least one light emitting element 221 is provided at a position corresponding to the at least one keypad display 210 and is adapted to emit most of the light from the light emitting unit 220, enabling emission of a large amount of light from the keypad display 210. The light emitting element 221 may be provided at a position to enhance the efficiency of light emission by preventing the light from being emitted from areas other than the keypad display 210. The light emitting element 221 refers to all kinds of light emitting elements including LED chips, and the like.

A reflector 230 may be provided between the front cover 200 and the light emitting unit 220 and is used to reflect the light emitted from the light emitting element 221. In other words, the reflector 230 may include a front surface that faces a rear surface of the light emitting unit 220, and a rear surface that faces the front surface of the top chassis 160.

The reflector 230 serves to increase the intensity of light emitted through the exposure points 300a of the keypad display 210 by reflecting the light emitted from the light emitting element 221. Specifically, the reflector 230 reflects the light emitted from the light emitting element 221 without absorption or transmission of the light, enabling a greater amount of light to be transmitted in the thickness direction T1 towards a user through the exposure points 300a.

Accordingly, even when light is irradiated from only one side of the light emitting element 221, the reflector 230 serves to evenly transmit the light through the overall surface of the light emitting unit 220, thus preventing brightness imbalance. Thereby, the reflector 230 functions to assure even transmission of light through the exposure points 300a of the keypad display 210, resulting in an improvement in brightness uniformity.

Figure 6:
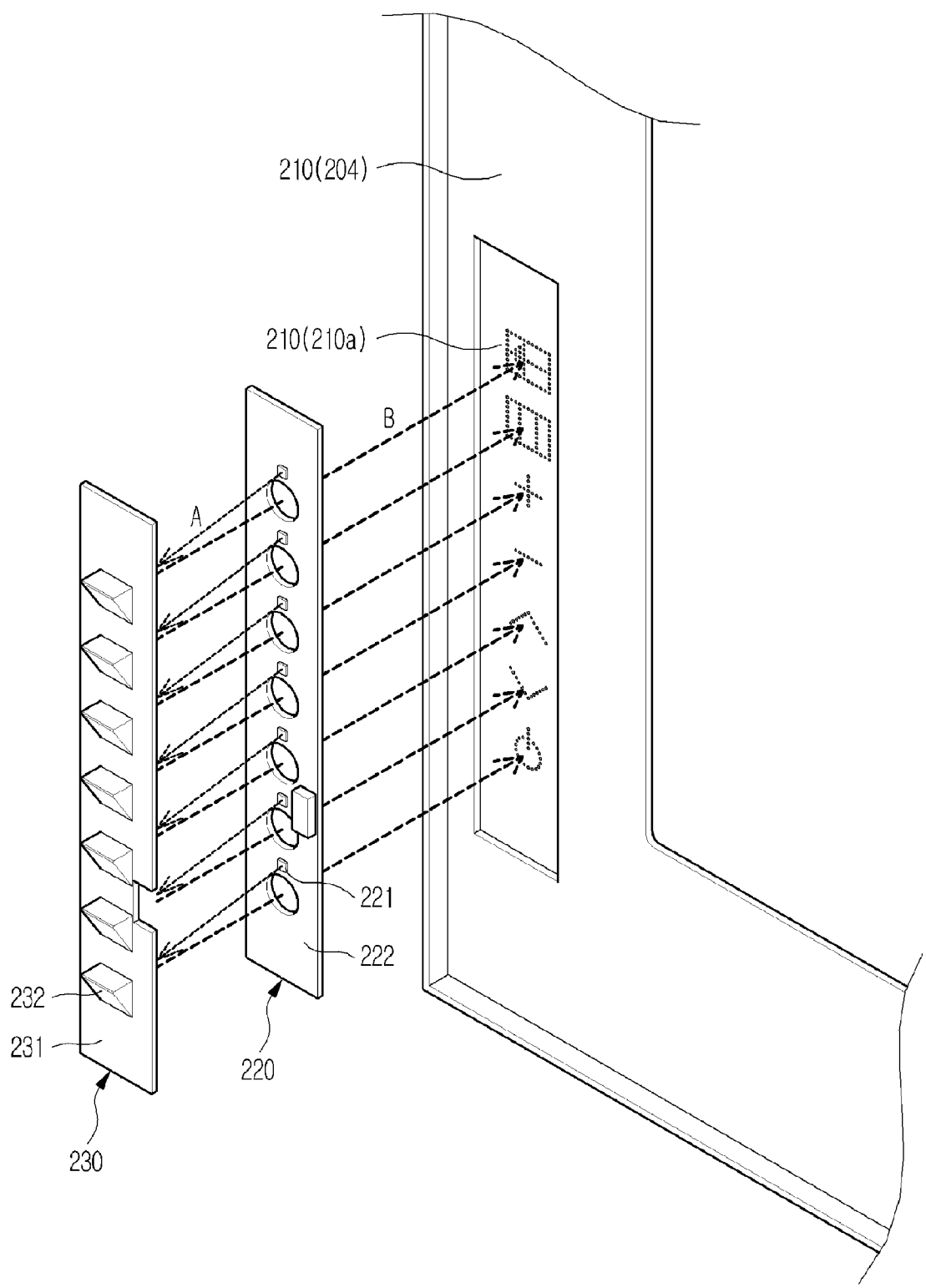
FIG. 6 is a perspective view illustrating propagation of light according to an exemplary embodiment of the present general inventive concept.

The reflector 230 may include a rectangular flat surface portion 231 to define the front surface of the reflector 230, and an indentation 232 formed in the flat surface portion 231 to correspond to the light emitting unit 220. As illustrated in FIGS. 3 and 6, the indentation 232 may be formed in a direction opposite of thickness direction T1, towards the rear cover 400.

The flat surface portion 231 is located at a plane parallel to the front cover 200, and the indentation 232 is rearwardly dented from the plane on which the flat surface portion 231 is located toward the rear cover 400. Here, the flat surface portion 231 and the indentation 232 may be integrally formed with each other. Accordingly, the indentation 232 may provide the flat surface portion 232 with a convex and concave configuration suitable to diffuse the light introduced thereinto.

Figure 7:
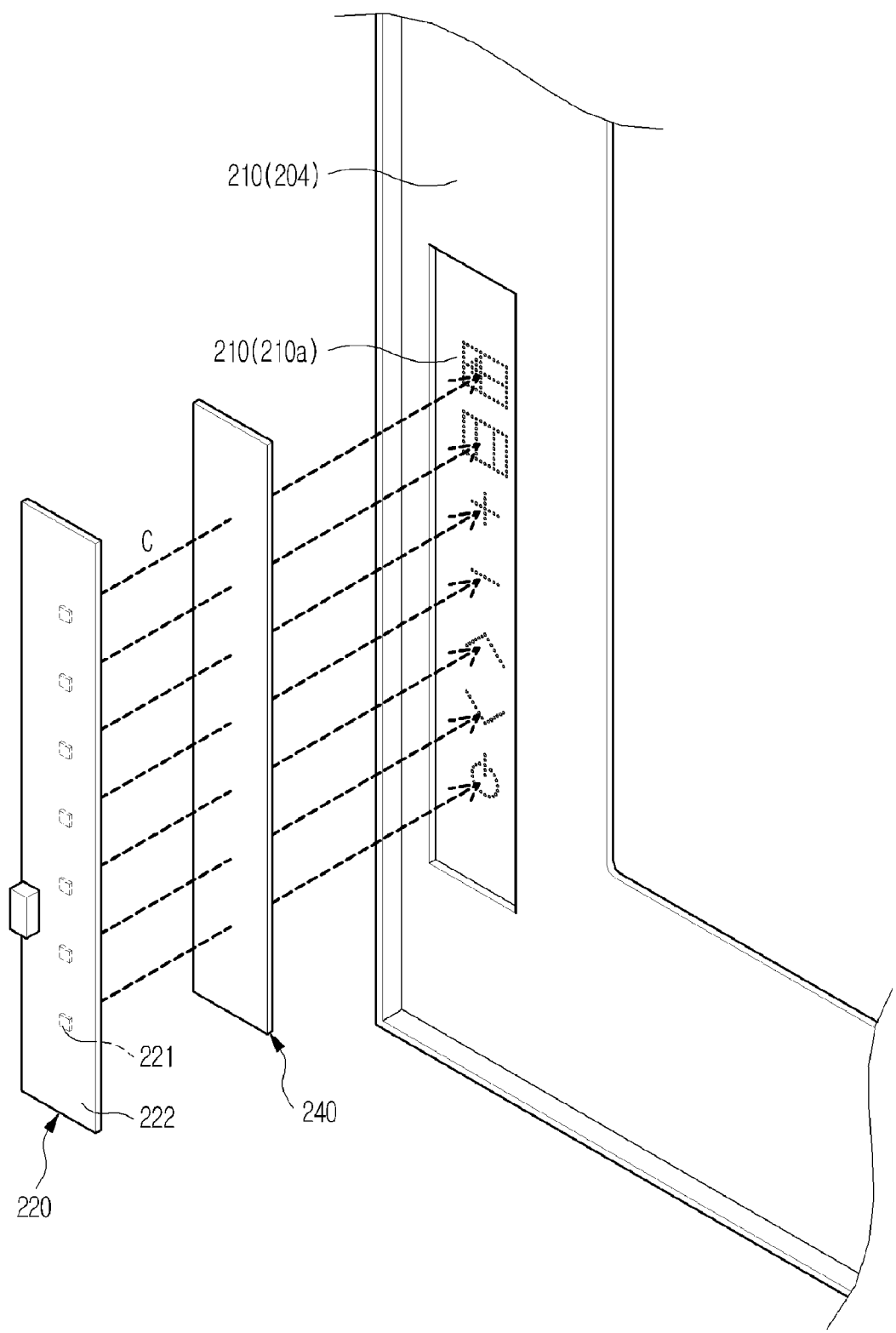
FIG. 7 is a perspective view illustrating propagation of light according to another exemplary embodiment of the present general inventive concept.

As illustrated in FIG. 7, a diffuser 240 may be provided between the front cover 200 and the light emitting unit 220, to transmit the light from the light emitting unit 220 to the keypad display 210. The diffuser 240 can diffuse and disperse the light emitted from the light emitting unit 220, thus improving brightness uniformity at the exposure points 300a of the keypad display 210.

Hereinafter, operation of the display device according to an exemplary embodiment of the present general inventive concept will be described.

FIG. 6 is a view illustrating propagation of light from the light emitting unit to the front cover according to an exemplary embodiment of the present general inventive concept, and FIG. 7 is a view illustrating propagation of light from the light emitting unit to the front cover according to another exemplary embodiment of the present general inventive concept.

As illustrated in FIG. 6, when light is emitted in a direction A from the light emitting element 221 provided in the light emitting unit 220, the light is directed in a direction B to the light guide channel 300 of the incidence plane I of the front cover by the reflector 230. After being introduced into the incidence plane I, the light is transmitted in the thickness direction T1 towards a user via the exposure points 300a by way of the light guide channel 300 of the keypad display 210.

Also, as illustrated in FIG. 7, when light is emitted in a direction C from the light emitting element 221 provided in the light emitting unit 220, the light is directed to the light guide channel 300 of the incidence plane I of the front cover 200 through the diffuser 240. After being introduced into the incidence plane I, the light is transmitted in the thickness direction T1 towards a user via the exposure points 300a by way of the light guide channel 300 of the keypad display 210.

Figure 8A:
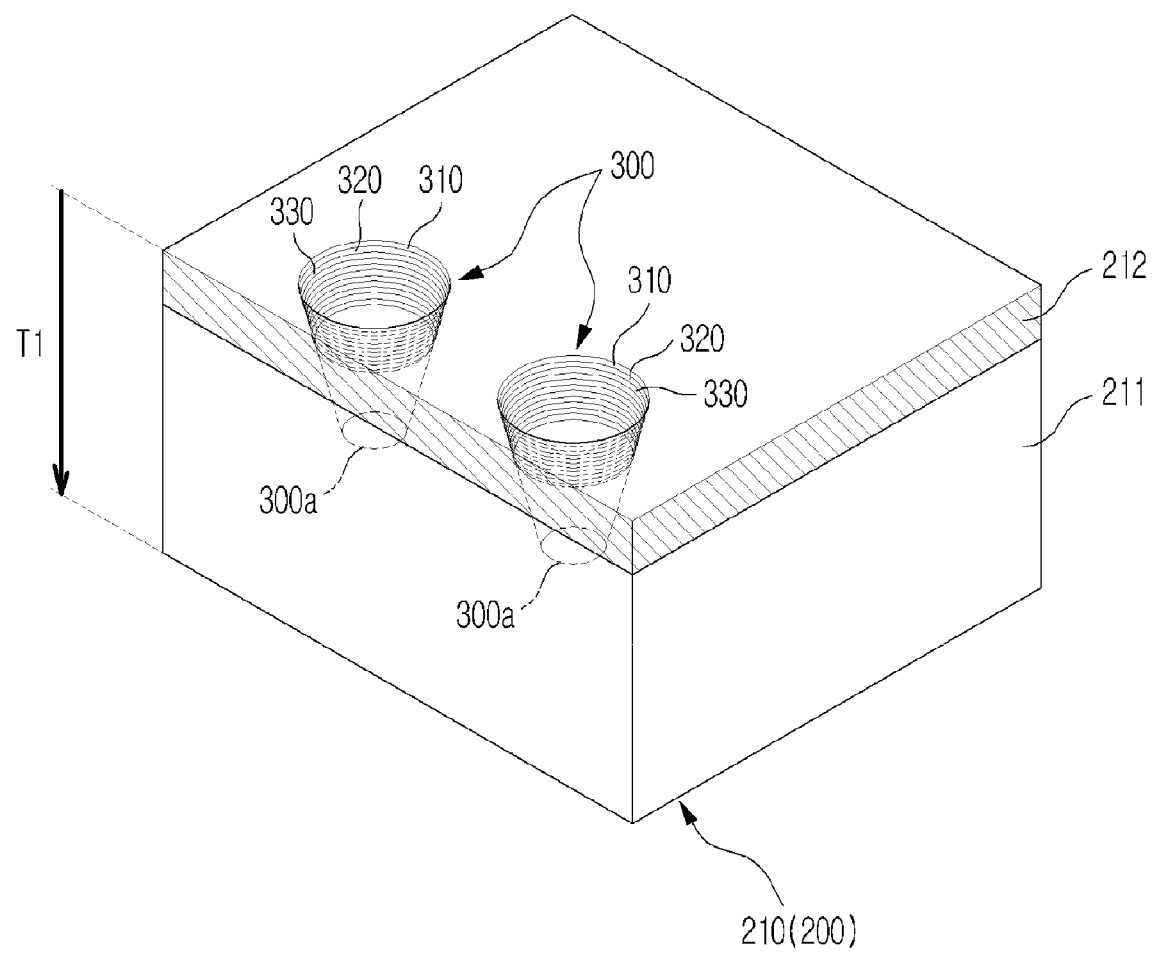
FIG. 8A is a perspective view illustrating light guide channels according to an exemplary embodiment of the present general inventive concept.

FIG. 8A is a perspective view illustrating light guide channels 300 according to an exemplary embodiment of the present general inventive concept. As illustrated in FIG. 8A, light guide channels 300 may be formed in a thickness direction T1 of the front cover 200 through the first thickness part 211 and the second thickness part 212. The light guide channels 300 may each include a first incidence face 310, a second incidence face 320, a third incidence face 330, etc. The light guide channels 300 may each include a last incidence face that corresponds to exposure points 300a.

Figure 8B:
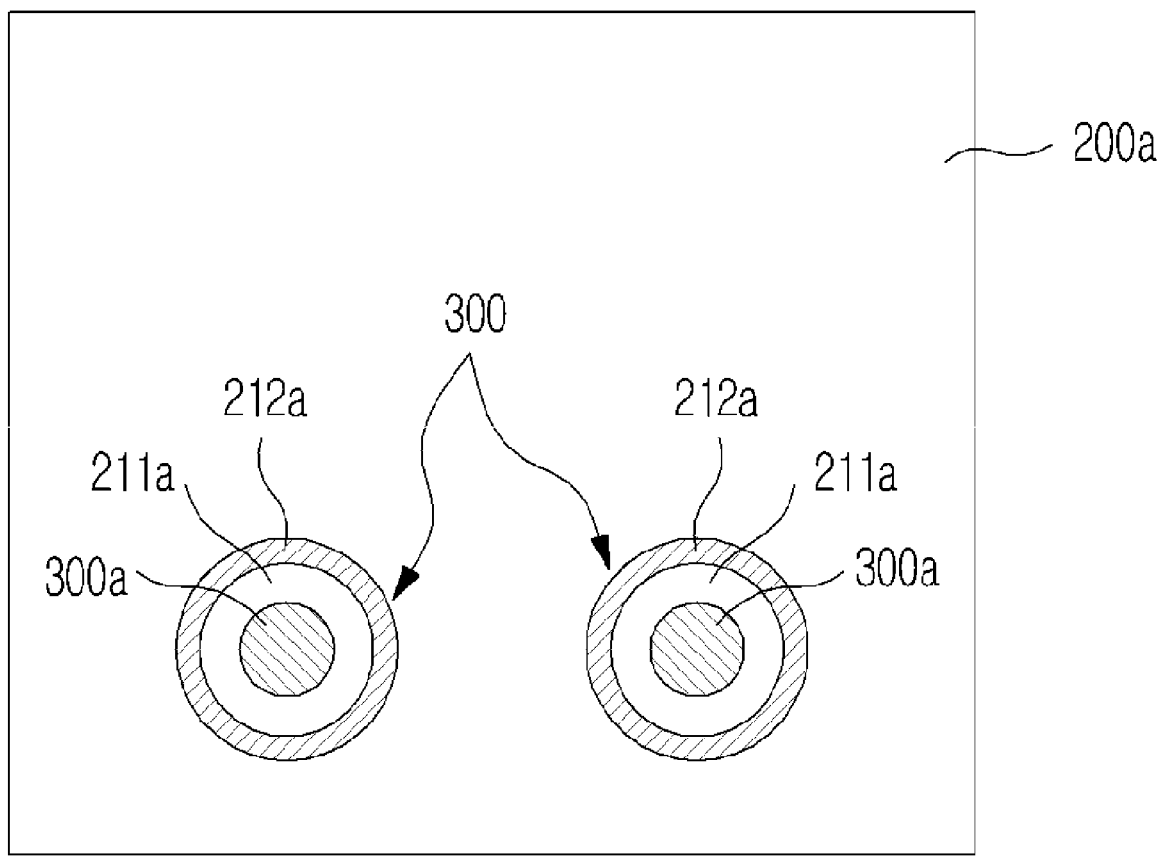
FIG. 8B is a top-down view illustrating light guide channels according to an exemplary embodiment of the present general inventive concept.

FIG. 8B is a top-down view illustrating light guide channels 300 according to an exemplary embodiment of the present general inventive concept. As illustrated in FIG. 8B, light guide channels 300 may be formed in the light transmitting portion 200a. The light guide channels 300 may each include the opening of the second thickness part 212a, the opening of the first thickness part 211a, and exposure points 300a.

Figure 9A:
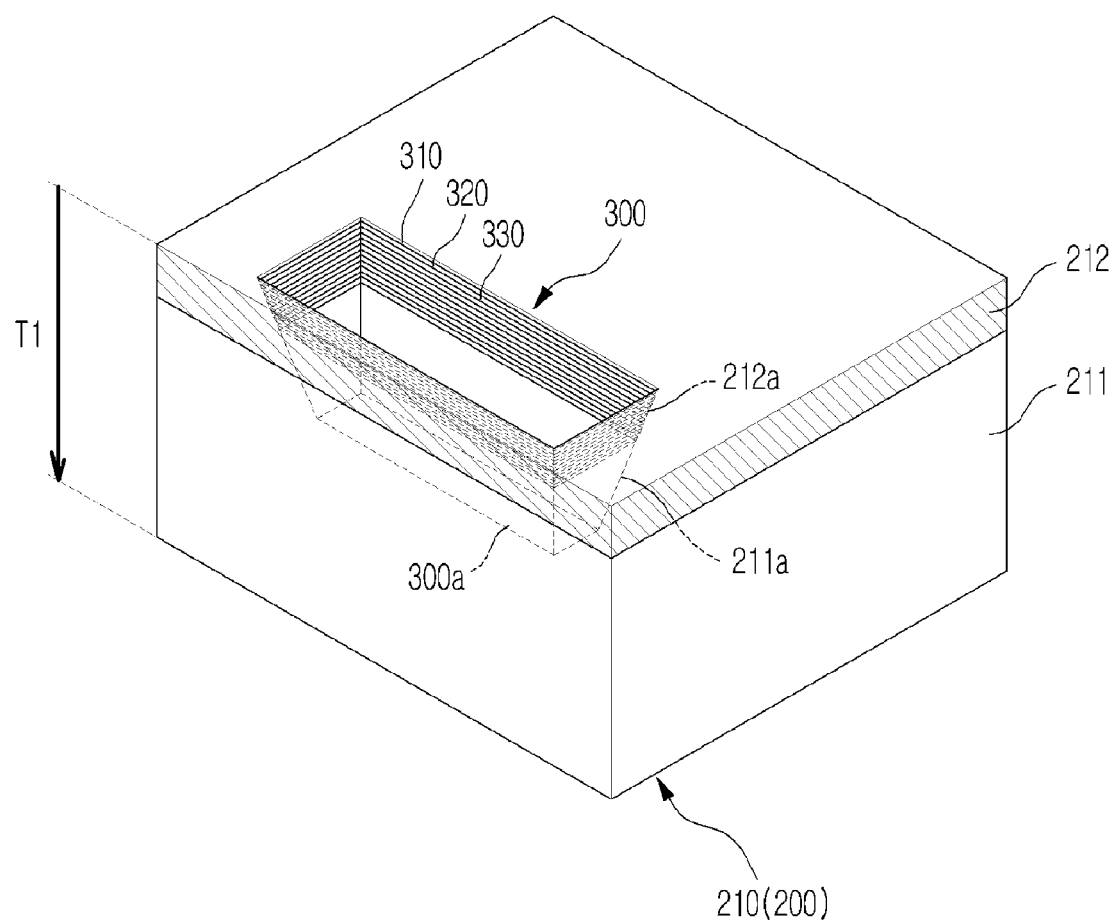
FIG. 9A is a perspective view illustrating a light guide channel according to an exemplary embodiment of the present general inventive concept.

FIG. 9A is a perspective view illustrating a light guide channel 300 according to an exemplary embodiment of the present general inventive concept. As illustrated in FIG. 9A, the light guide channel 300 may be formed in a thickness direction T1 of the front cover 200 through the first thickness part 211 and the second thickness part 212. The light guide channel may include the opening of the second thickness part 212a, the opening of the first thickness part 211a, and the exposure point 300a. The light guide channel 300 may include a first incidence face 310, a second incidence face 320, a third incidence face 330, etc. The light guide channel may also include a last incidence face that corresponds to exposure point 300a. The exposure point 300a may be generally rectangular in shape.

Figure 9B:
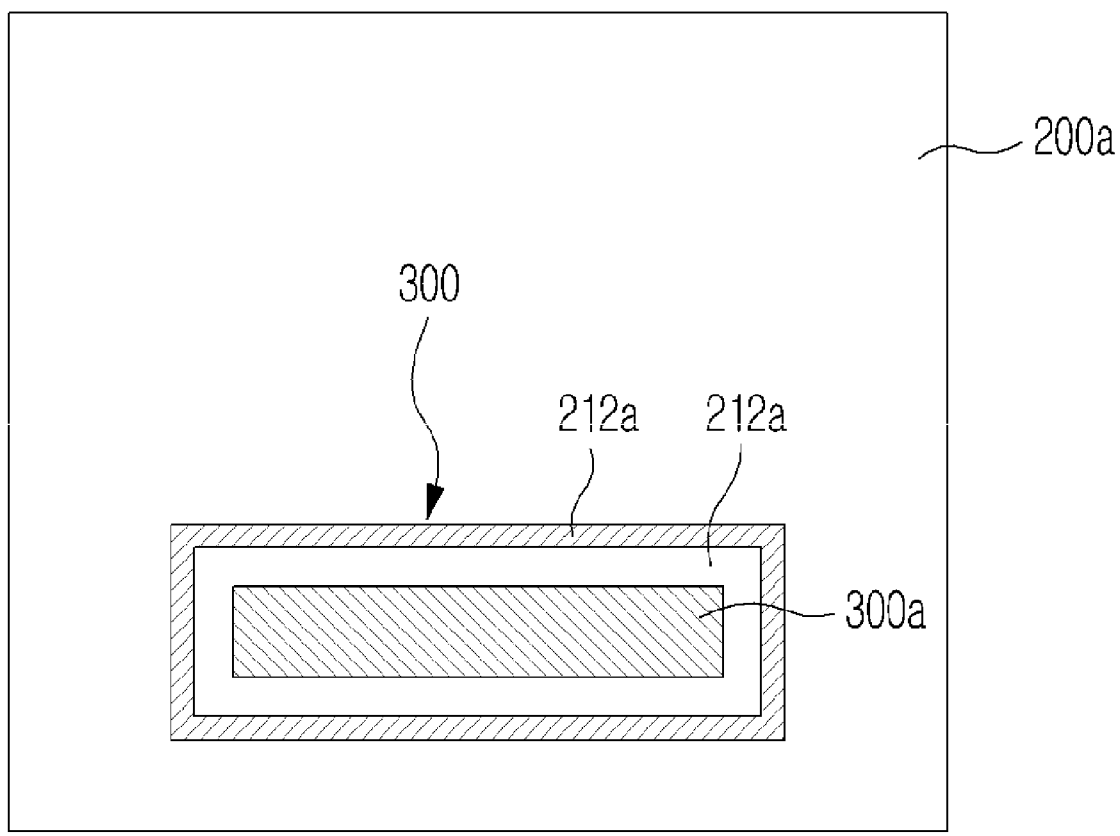
FIG. 9B is a top-down view illustrating a light guide channel according to an exemplary embodiment of the present general inventive concept.

FIG. 9B is a top-down view illustrating a light guide channel 300 according to an exemplary embodiment of the present general inventive concept. As illustrated in FIG. 9B, the light guide channel 300 may be formed in the light transmitting portion 200a. The light guide channel may include the opening of the second thickness part 212a, the opening of the first thickness part 211a, and the exposure point 300a.

Since the incidence plane I is provided, along a thickness direction T1 of the front cover 200, with the light guide channel 300 having a concave dome shape or reverse dome shape, most of the light emitted from the light emitting unit 220 is able to be transmitted to the keypad display 210 without a risk of total reflection.

Further, the multilayer stepped structure 300b of the light guide channel 300 causes total directional dispersion and reflection of the light emitted from the light emitting unit 220, allowing the user to visually perceive the keypad display 210 from any angle.

As is apparent from the above description, the present general inventive concept provides a display device wherein a keypad display is viewable to a user only during operation of the display device. Further, using a light guide channel provides total directional dispersion and reflection of light from a light emitting unit. This has the effect of enabling the user to visually perceive the keypad at every angle.

Although several exemplary embodiments of the present general inventive concept have been illustrated and described, it would be appreciated by those skilled in the art that changes may be made in these exemplary embodiments without departing from the principles and spirit of the general inventive concept, the scope of which is defined in the claims and their equivalents.

What is claimed is:

1. A display device comprising:
a display module having a light source and a display panel to form an image;
a front cover to cover a rim of the front surface of the display module, the front cover providing an opening defined by the rim to expose the image formed on the front surface of the display module;
a keypad display provided at the front cover;
at least one light emitting unit to emit light to the keypad display; and
at least one light guide channel provided at the keypad display and enclosing a cross-sectional area decreasing away from the light emitting unit.

2. The display device according to claim 1, wherein the keypad display includes exposure points which are formed at the light guide channel at the farthest position from the light emitting unit and have the smallest cross-sectional area.

3. The display device according to claim 1, wherein the light guide channel includes a first incidence face adjacent to the light emitting unit, and at least one second incidence face enclosing a different cross-sectional area from the first incidence face.

4. The display device according to claim 1, wherein the light guide channel is concavely domed in a thickness direction of the front cover.

5. The display device according to claim 1, wherein an inner periphery of the light guide channel includes a multilayer stepped structure in a thickness direction of the front cover.

6. The display device according to claim 1, wherein the light guide channel includes at least two incidence faces to which the light is introduced.

7. The display device according to claim 1, wherein the front cover includes a light transmitting portion through which the light emitted from the light emitting unit is transmitted, wherein the light transmitting portion includes an outwardly exposed first thickness part to define an outer surface of the front cover and a second thickness part to define an inner surface of the front cover, the second thickness part enabling transmission of the light from the light emitting unit to the first thickness part, and wherein the first thickness part is made of a transparent material and the second thickness part is made of a semi-transparent material.

8. The display device according to claim 3, wherein the first incidence face and the at least one second incidence face define a stepped structure to allow the light emitted from the light emitting unit to be dispersed and reflected in different directions.

9. The display device according to claim 5, wherein the multilayer stepped structure is formed by multistage laser processing.

10. The display device according to claim 7, wherein the light guide channel is dented in a thickness direction of the front cover through the first thickness part and the second thickness part by a predetermined inclination angle.

11. The display device according to claim 1, wherein the front cover includes an upper portion, a lower portion, a left portion and a right portion, and the keypad display is provided on at least one of the upper portion, lower portion, left portion and right portion.

12. The display device according to claim 2, wherein the keypad display takes the form of letters, numbers and symbols through combinations of the exposure points.

13. The display device according to claim 2, wherein a reflector is provided between the display module and the light emitting unit to enable even transmission of the light to the exposure points.

14. The display device according to claim 2, wherein a diffuser is provided between the light emitting unit and the at least one light guide channel to enable even transmission of the light to the exposure points.

15. The display device according to claim 1, wherein the light emitting unit includes an LED chip.

16. The display device according to claim 1, wherein the light emitting unit includes an input element to sense an input.

17. A front cover of a display device having a light source and a display panel to display an image thereon, the front cover defining an exterior appearance of a front side of the display device and defining an opening to expose the image of the display device, the front cover comprising:
   a light guide recess formed from an inner surface of the front cover that faces the interior of the display device to an outer surface of the front cover, and the light guide recess to have a stepped structure enclosing different cross-sectional areas on a per depth basis thereof.

18. The front cover according to claim 17, wherein an inner periphery of the light guide recess has a multilayer stepped structure.

19. The front cover according to claim 18, wherein the multilayer stepped structure is formed by multistage laser processing.

20. A display device, comprising:
   a display module to display an image on a screen thereof;
   a front cover disposed on an exterior portion of a front side of the display module to define an opening to expose the image displayed on the screen; and
   a key display unit disposed on the front cover to display a character having one or more light guide channels spaced apart from each other by a distance variable in a direction with respect to a second direction different from the first direction.

21. The display device of claim 20, wherein the light guide channel has a structure having a thickness variable in the direction with respect to the second direction.

22. The display device of claim 20, wherein the light guide channel comprises:
   stepped structures; and
   an exposure point disposed between adjacent stepped structures.

23. The display device of claim 22, wherein the stepped structures comprise:
   a surface inclined with respect to the second direction.

* * * * *